United States Patent
Watson et al.

(10) Patent No.: US 9,771,042 B2
(45) Date of Patent: Sep. 26, 2017

(54) OCCUPANT CLASSIFICATION SYSTEM

(75) Inventors: William Todd Watson, Belleville, MI (US); Leonard Cech, Brighton, MI (US); James Gregory Stanley, Novi, MI (US); Scott Kerby, Wolverine Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 1833 days.

(21) Appl. No.: 12/801,668

(22) Filed: Jun. 18, 2010

(65) Prior Publication Data

US 2011/0029203 A1 Feb. 3, 2011

Related U.S. Application Data

(60) Provisional application No. 61/213,566, filed on Jun. 19, 2009.

(51) Int. Cl.
*B60R 21/015* (2006.01)

(52) U.S. Cl.
CPC .. *B60R 21/01532* (2014.10); *B60R 21/01526* (2014.10)

(58) Field of Classification Search
CPC ................................................ B60R 21/01532
USPC ........................................................... 701/45
See application file for complete search history.

(56) References Cited

U.S. PATENT DOCUMENTS

| 6,598,900 B2 * | 7/2003 | Stanley et al. ................. 280/735 |
| 2006/0025897 A1 * | 2/2006 | Shostak et al. ................... 701/1 |

* cited by examiner

*Primary Examiner* — Ryan Zeender
*Assistant Examiner* — Fawaad Haider
(74) *Attorney, Agent, or Firm* — Gordon & Rees LLP

(57) ABSTRACT

A system for classifying an occupant located on a seating surface of a vehicle seat. The system includes a movable element and an electrode located in the vehicle seat. A sensing circuit is provided to supply a signal to the conductor. The sensing circuit also includes measurement electronics configured to measure the signal to the conductor and the vibration of the moveable element. A controller is configured to discriminate between different types of objects located on the seating surface based on changes in the signal being supplied to the conductor and the vibration of the moveable element.

14 Claims, 9 Drawing Sheets

OCCUPANT CLASSIFICATION SYSTEM

CROSS REFERENCE TO RELATED APPLICATIONS

This application claims priority to and the benefit of U.S. Provisional Patent Application Ser. No. 61/213,566, filed Jun. 19, 2009.

BACKGROUND

The present disclosure relates generally to the field of occupant classification. Occupant classification is used in automotive, heavy truck, transport, commercial, and health industries to determine the weight, stature, position, movement, and other factors of a person or object residing on a floor, bed, or seat. For example, in a car or truck, electric field sensing may be used to differentiate a child seat from a small child and from an adult person. However, in certain situations electric field sensing may not differentiate or discriminate between a child seat or other objects from an empty seat.

SUMMARY

As described herein, an electric field sensor may be used in combination with sensing the motion of an element in a vehicle seat to improve the classification of an object on a seat. One disclosed embodiment relates to a system for classifying an occupant located on a seating surface of a vehicle seat. The system includes a movable element located in the vehicle seat. The movable element is configured to move when there is downward force on the element. The system includes an electric field sensor located in the vehicle seat. The electric field sensor includes a first conductor positioned below the seating surface of the seat. A sensing circuit is configured to supply a first signal to the first conductor. The sensing circuit includes measurement electronics configured to measure the current being supplied to the first conductor. The measurement is affected by the presence of an object on the seating surface, and wherein the measurement electronics are also configured to measure the vibration of the moveable element. The system also includes a controller configured to discriminate between different types of objects located on the seating surface based on changes in the current being supplied to the first conductor and the moveable element's movement; and wherein the controller is configured to control a safety restraint system based on the discrimination.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Referring generally to the figures, an occupant classification system for a seat for detecting and classifying a person or objects is shown and described. The occupant classification system may include multiple sensing elements (e.g., a capacitive sensing element in combination with a piezoelectric element or a force sensitive resistor element, etc.) for sensing a person or objects on a seat. The occupant classification system uses the signals provided by the sensing elements to classify and discriminate between people and objects.

The classification of an object or person located on a seat may be improved by the use of multiple sensing elements. For example, by using a capacitive sensing element and a vibration sensing element, additional confidence of the object classification may be achieved. Under a normal range of conditions, the two sensors may provide identical information regarding the object classification. However, a capacitive sensor may misread charging electronics placed on the seat as a small person or a person elevated above an electrode of the classification system (e.g., the person is sitting on a thick blanket, car seat cover, or other object). Or the capacitive sensor may classify an inanimate object as a person if the seat is wet, or if there are other potential changes in environment around the seat. The mechanical vibration sensing element may generally indicate the mass of the object or person on the seat, but only when there is some movement of the mass of the person or object. Thus, when a sensor that relies on mechanical sensing such as a measuring a signal from a movable or vibrating element, is used in combination with a capacitance or electric field type sensor, the occupant classification may be more accurate. The mechanical sensor would have less sensitivity to various conditions described above. Therefore, the capacitive sensor may make the primary classification decision, but may be overridden by the mechanical sensor if the two sensors indicate different types of objects or persons (e.g., if the mechanical sensor indicates a large object and the capacitive sensor does not).

Figure 1A:
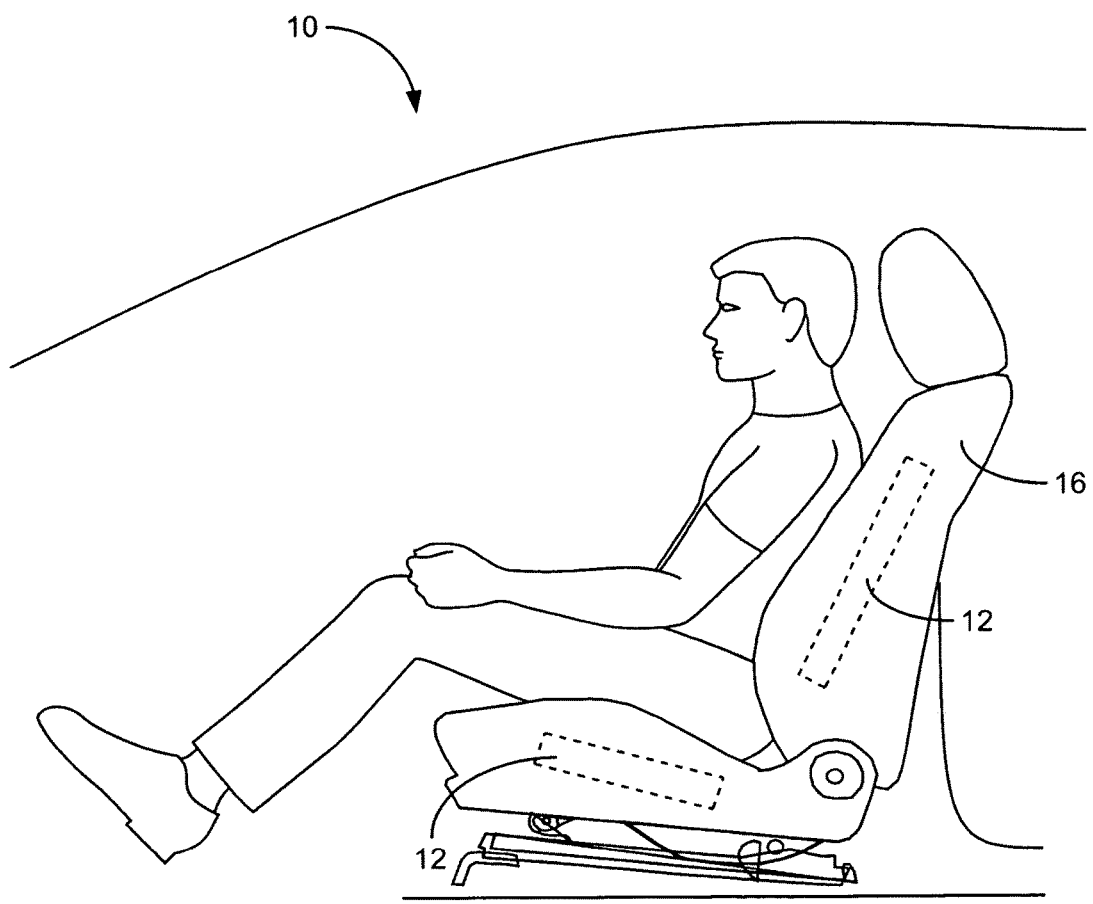
FIGS. 1A-B are perspective views of a car seat and occupant classification sensors in a car seat, according to exemplary embodiments.
Figure 1B:
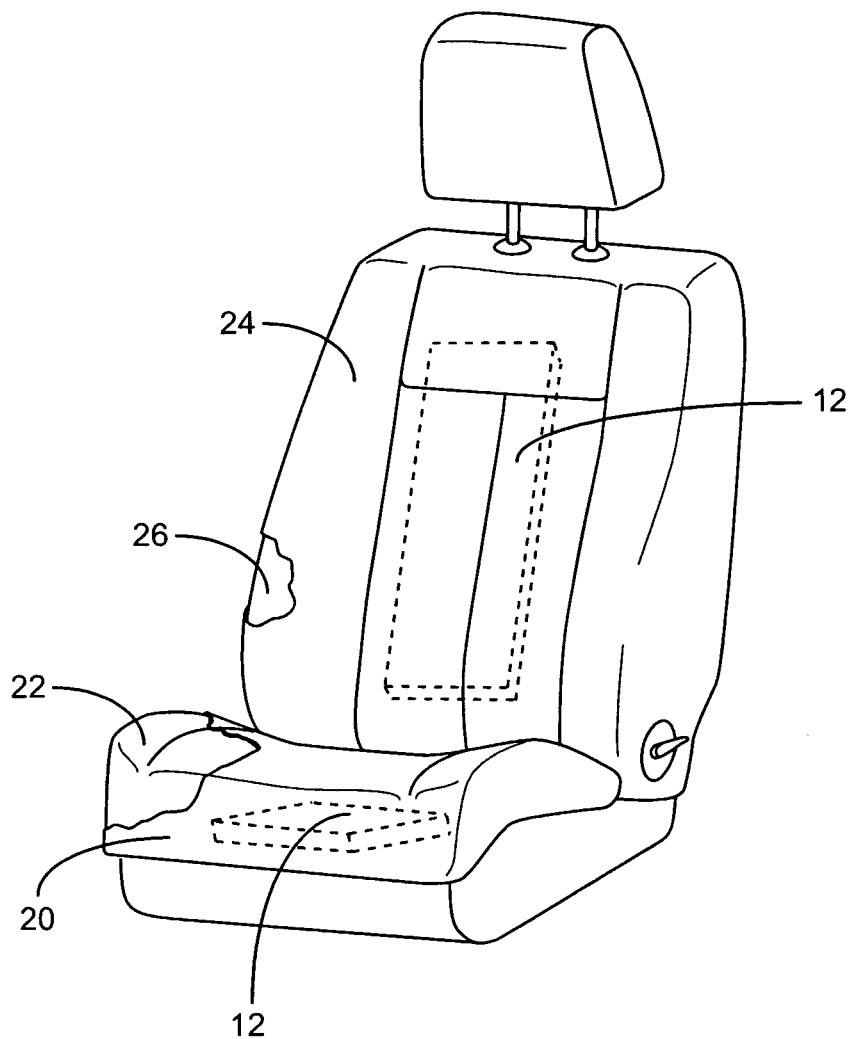

An electrode of an occupant classification system for a seat may be located above the seat foam and near the seating surface as generally shown in FIGS. 1A-B. The occupant classification system may sense mechanical vibrations using piezoelectric coaxial cable to differentiate empty seats from loaded (e.g., occupied) seats, but this sensing technique may not easily differentiate heavy non-live loads from persons. Mechanical sensors for occupant detection and discrimination may be located under the seat cushion and near the seat pan. Other occupant sensing systems may use cameras, lasers, ultrasonic frequencies, capacitive sensing, etc.

Electric field capacitive occupant sensing systems may have difficulty distinguishing empty seats from seats loaded with some objects or loaded with a child in a child seat. It may be desirable to differentiate a wider range of occupant classes, for example, a female weighing in a lower 5th-percentile of females from a male weighing in a 50th-percentile of males, to aid in adapting restraints to better restrain a wide range of occupants. More expensive weight sensing systems may be able to perform the desired classifications, but the cost, mass, and size of these systems makes them undesirable for the application.

A combination of sensing methods using unique physical phenomenon (e.g., mechanical resonance and occupant/object capacitance) may discriminate more or all desired conditions in a single integrated sensor and processing element at a lower cost than using separate sensing elements. The collocation of two sets of sensing elements (e.g., a conductor, a piezoelectric element, force sensitive resistor, etc.) in a single package may reduce the effort and cost of manufacturing, wiring transport, integration, and validation as compared with separate sensors.

A combination of an electric field sensing system and mechanical vibration sensing system may be able to differentiate more seat loading conditions and may be able to differentiate live from non-live loads. The combination does not simply combine two existing designs or measurements. The sensors may be collocated near the seat surface to provide additional sensitivity to the mechanical vibration sensor and to allow the capacitive electrode to act as an electromagnetic shield for the mechanical vibration sensor, if required. The signals from the two sensors can be multiplexed into shared electronics for cost savings and for simplification of the electronics. The integration of the two sensors may make it cost effective for the mechanical vibration sensor to be distributed over a larger area corresponding to a portion of the capacitive electrode footprint to increase its sensitivity and discrimination capability with regard to the size and distribution of the load in the seat. Additionally, the algorithms used to differentiate the object or occupant in the seat may combine the signals from the two sensors to improve the discrimination rather than simply considering the signals separately. Also, in an alternative embodiment described below, the two sensors may be integrated into a single sensor. In a single sensor system, the electric field and vibration sensing components may be separated through signal processing techniques.

Capacitive electric field sensor design has evolved to cover a wide area of the seat that is typically occupied by a person sitting in a variety of positions and orientations on the seat. However, the shape and placement of a conventional mechanical vibration sensor or network of sensors has not been designed to optimize the information available in the sensing signal. The mechanical vibration sensor of the present disclosure may differentiate an empty seat from a seat occupied by a child seat or another small object (e.g., less than about 40 pounds). The mechanical vibration sensor may also be able to aide in the differentiation of the presence of people or objects of varying weights (e.g., a 5th-percentile female from a 50th-percentile male). For example, the differentiation of a 5th-percentile female from a 50th-percentile male may include a fusion of the sensor information from the mechanical and the electric field sensing signals into an advanced algorithm. Neither sensor alone may be able to reliably differentiate these two occupant classes over a range of real world due-care seating cases, including sitting on a wet seat, sitting on top of a seat covered with a blanket, sitting in unusual positions, sitting with no occupant movement, etc.

Referring generally to the figures, various sensing techniques are shown that may be used in an occupant classification system. The vibrational sensing that is shown and described senses the vibrational energy that may come from the car (e.g., vibrational energy from running engine, a bumpy road, etc.) resulting in occupant motion in the vehicle. Forces may be applied to the sensors of the occupant classification system through the seat and any object on the seat. The frequency response is constrained by the seat and the object on the seat (e.g., the mass of the object or person, any spring or damper properties of the seat and object, etc.) Various techniques for sensing this vibration may be used to identify and classify an object or person based on the vibration.

The mechanical vibration sensor may be able to sense and measure the low frequency vibration (e.g., between about 0.1 Hz and 50 Hz) of the sensor either passively or actively. Active measurements may make a true 0 Hz measurement response possible. For active measurement, the sensor may be co-located with an actuator that first induces an electromechanical impulse and then the sensor may sample the signal damping characteristics due to the impulse. Electrical time of flight measurements may also be made through a piezoelectric material under static stress and several technologies may be used to sense this vibration. Piezoelectric/resistive sensors are one technically viable choice for the sensing element. The sensor or sensing element may be thin film, wire shaped, or any low-profile flexible shape that is capable of being integrated into the seat such that the sensor would not cause discomfort to occupants. The sensor must also be configured to meet durability, environmental and aging requirements.

Referring now to FIG. 1A, an occupant classification system 12 is shown located in the bottom and the back of the seat 16 of a vehicle 10. When a person or object sits on the seat 16, the occupant classification system 12 detects the presence of the person or object as pressure is applied by the person or object on the seat 16. According to various exemplary embodiments, the occupant classification system 12 is located within the seat 16 and is configured to detect and classify objects and people sitting on the seat 16. Referring also to FIG. 1B, the occupant classification system 12 may be located below the seat bottom cover 20 and above the seat bottom cushion 22, and between the seat back cover 24 and the seat bottom cushion 26. According to various exemplary embodiments, the occupant classification system 12 may be embedded in the seat foam in seat cushions 22, 26 or may be located anywhere in the seat 16 such that the occupant classification system 12 can properly classify objects and people on the seat 16. It is important to note that the location of the occupant classification system 12 in FIGS. 1A-B is approximate and it should be understood that the location, size, and dimensions of the various components of the occupant classification system 12 can vary. For example, a controller for receiving signals from sensors of the occupant classification system 12 may be located separately from the rest of the occupant classification system 12.

As another example, the occupant classification system 12 is shown as generally planar in FIGS. 1A-B (e.g., the sensing elements of the system 12 are planar and parallel to the seating surfaces of the seat 16), the shape of the components of system 12 may vary. Furthermore, although a sensor may be provided in the seat back, the sensing location may be preferably located only in the seat bottom in order to limit the number of sensors and reduce the cost of the system.

Figure 2:
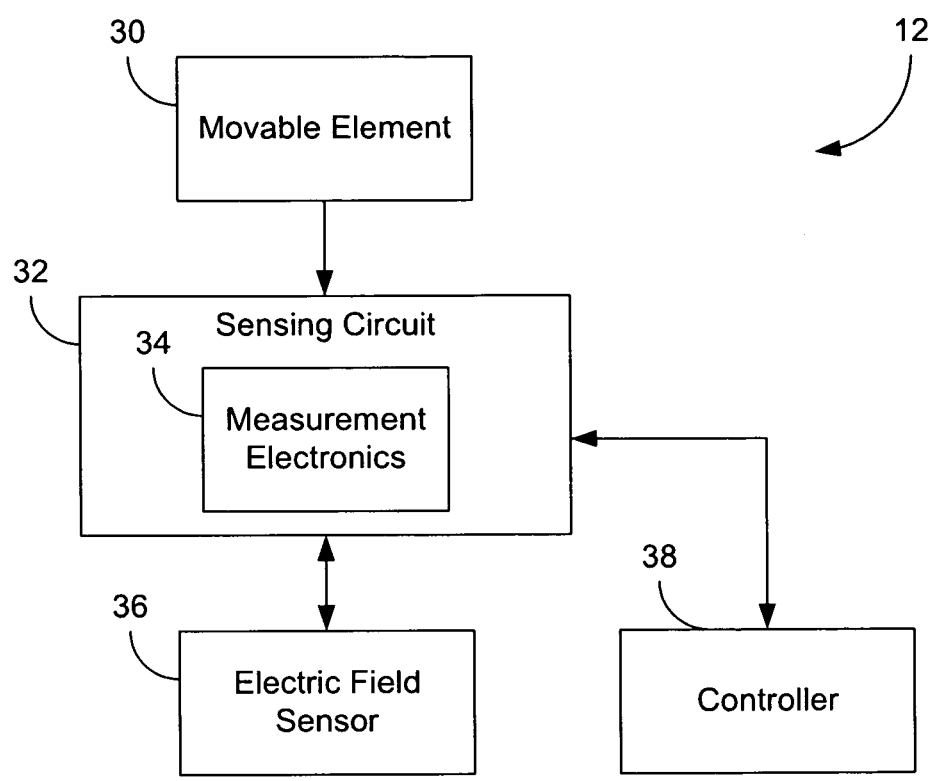
FIG. 2 is a block diagram of an occupant classification system, according to an exemplary embodiment.

Referring now to FIG. 2, a simplified block diagram of an occupant classification system 12 is shown, according to an exemplary embodiment. The occupant classification system 12 includes a movable element 30 which may be located in a vehicle seat. The movable element 30 may be a piezoelectric sensor, a force sensitive resistor, a mechanical vibration sensing element, a conductor etc. The movable element 30 is configured to move when there is a downward force on the vehicle seat above it (e.g., the gravitational force associated with a person sitting on the seat, an object placed on the seat, etc.).

The occupant classification system 12 includes electronic circuitry. The circuitry may include a sensing circuit 32. The sensing circuit 32 may be located in the seat. The sensing circuit 32 includes measurement electronics 34 for measuring the movement of the movable element 12. Although mentioned as a part of the sensing circuit, the measurement electronics and the sensing circuit may be fully integrated circuitry or may alternatively be separate discrete components. The occupant classification system 12 further includes an electric field sensor 36 (e.g., an occupancy sensor) located in the seat. The electric field sensor 36 includes a conductor positioned below the surface of the seat. The measurement electronics 34 may measure the current being supplied to the conductor of the electric field sensor 36. Alternatively, the measurement electronics may measure another measure that may be correlated to a change in the electric field due to the presence of an occupant. The measurements made by the measurement electronics 34 are impacted by the presence of an object or person on the seating surface (e.g., the downward force of the person or object affects the measurements, as well as any shifting on the seat by the person or object). According to various exemplary embodiments, the occupant classification system 12 can include a single sensing circuit or multiple sensing circuits. For example, the system 12 may include a sensing circuit for measuring the movement or vibration of the movable element 30 and another sensing circuit for measuring the current supplied to the electric field sensor 36.

The occupant classification system 12 further includes a controller 38. The controller 38 is configured to receive changes in the signal being supplied to the conductor by the sensing circuit 32 and changes in the movement of the movable element 30 as detected by the measurement electronics 34. For example, the controller 38 may detect the changes in the vibration of the movement of the movable element 30 when a person or object sits on the seat or when a person or object shifts on the seat. Alternatively, the controller may detect changes in other measures of the signal provided by the movable element. For example, the controller may consider the vibration of the movable element over time and employ a ratio related to the average vibrational frequency to discriminate between different objects or persons on the seat. For example, the ratio of the vibrational energy in the 2 to 6 Hz range to the vibrational energy in the 10 to 20 Hz range can be used as a metric when identifying the size of the occupant. This ratio will normally increase as the occupant mass increases.

Using the data, the controller 38 may classify different types of objects and people occupying the seat. The controller 38 may use the classification to control a safety restraint system of the vehicle including the seat, according to an exemplary embodiment.

According to another exemplary embodiment, the controller 38 may be configured to measure the change in the signal being supplied to the conductor of the sensing circuit 32 and the changes in the frequency of the movement of the movable element 32 (e.g., the change in the oscillating signals). Using the measurements, the controller 38 may then classify the objects and/or person occupying the seat. According to one exemplary embodiment, the movable element 32 may be a second conductor, and the controller 38 may measure the difference in the magnitude of the capacitance between the movable element 32 and the conductor of the sensing circuit 32, as the capacitance between the two conductors changes as downward force is applied to the seat.

According to another embodiment, the movable element may be integrated into the capacitive or electric field sensor. For example, a single conductor or conductive mat may be used as both the capacitive or electric filed sensor and the mechanical vibration sensor. In such an embodiment, the signal from the electrode may be processed to provide two types of information relating to the object or person located on the seating surface. A signal from the capacitive sensor may be processed using measurement electronics that include a low pass filter in order to measure the amplitude of the capacitance associated with the capacitive sensor of the occupant classification system. The signal from the capacitive sensor may also be processed using a high pass filter to measure the mechanical vibration or frequency of the change in amplitude capacitance of the conductor or electrode. After being processed through the high pass filter, the vibration sensor signal may be amplified if needed and the frequency analysis of the signal would be performed (e.g., by a controller such as the controller 38 of FIG. 2). The frequency analysis may be done using frequency window comparisons, a fast Fourier transformation (FFT) or by another method. The resulting frequency information can be used to discriminate between different weight objects located on the vehicle seat. The average frequency of the vibration normally decreases as the mass on the seat increases.

Figure 10:
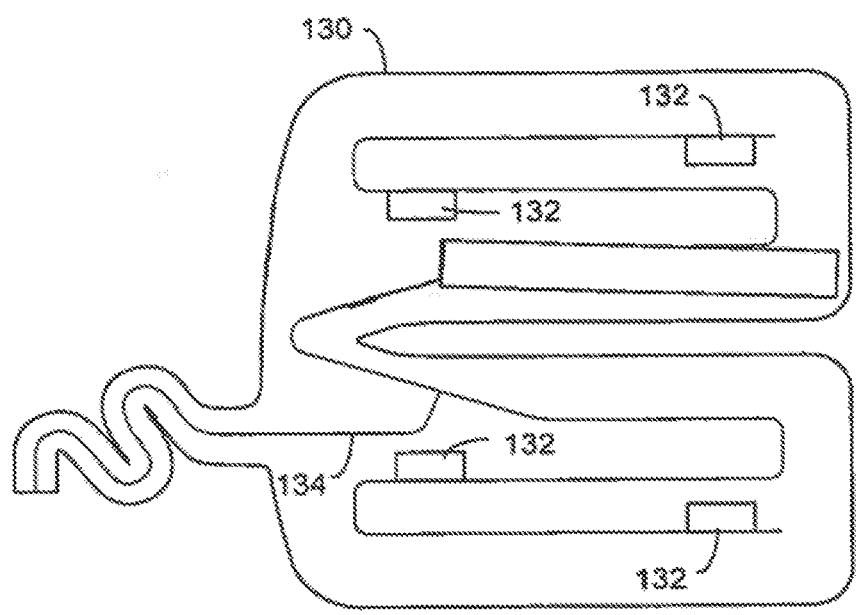
FIG. 10 is a diagram of an occupant classification system including a force sensitive resistor, according to an exemplary embodiment.

According to other disclosed embodiments, a separate movable element may be provided to sense mechanical vibration. For example, a piezoelectric element as described in FIGS. 3-6 may be used with a capacitive sensing element to determine if an object or person occupies a seat. As another example, a separate movable electrode may be provided, as shown in FIG. 7, and be used to determine occupancy and classify objects and people based on vibrational changes. As yet another example, vibration of a force sensitive resistive element as shown in FIG. 10 may be used to determine occupancy.

Figure 3:
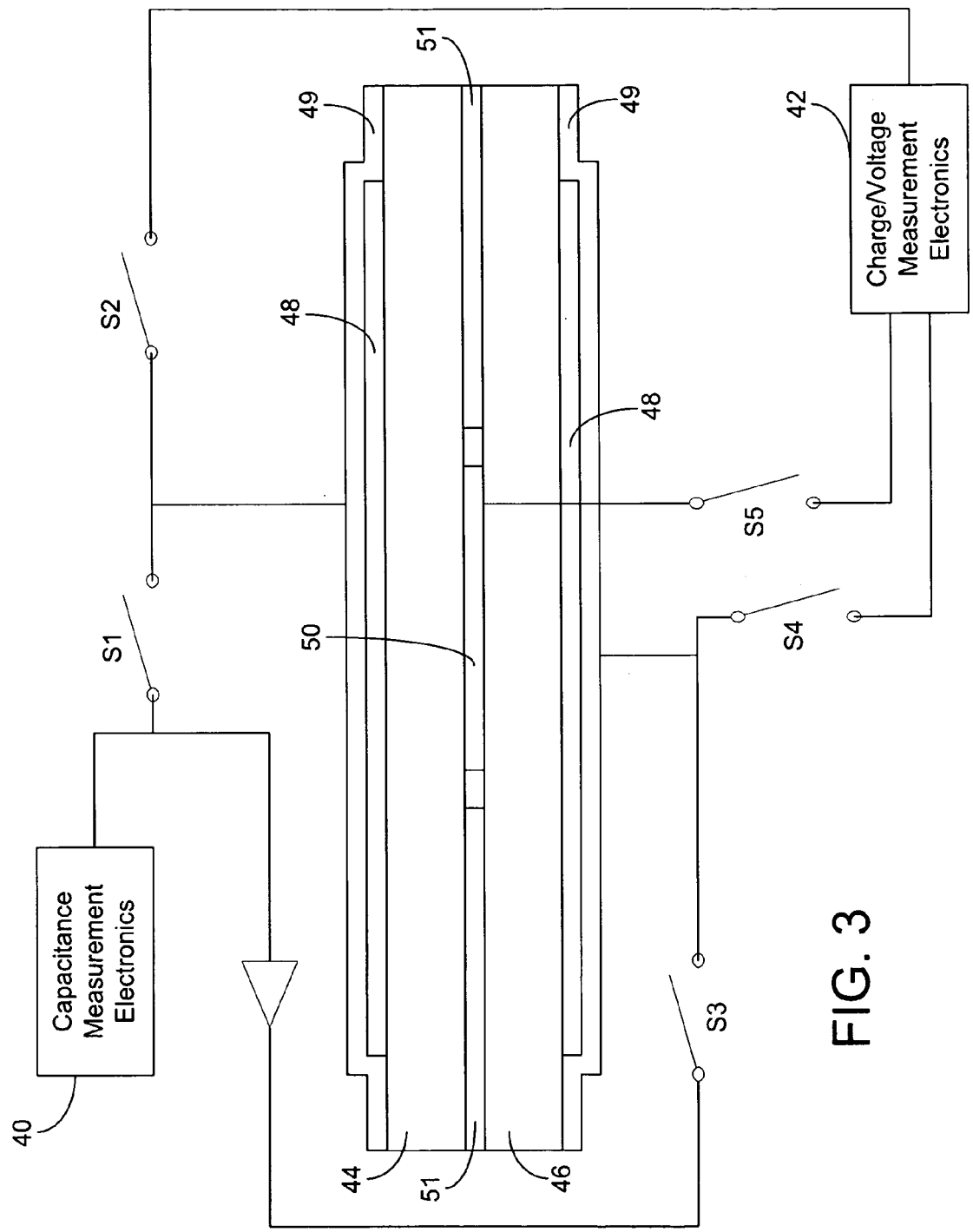
FIG. 3 is an electrical diagram of an occupant classification system including a capacitive element and a piezoelectric element, according to an exemplary embodiment.

FIG. 3 is an electrical diagram of an occupant classification system 12 including a capacitive element and a piezoelectric element that may be used for multiplexed occupant sensing. The occupant classification system 12 includes capacitance measurement electronics 40 and charge/voltage measurement electronics 42. The electronics 40, 42 may serve as the measurement electronics of the occupant classification system (e.g., the measurement electronics 34 as shown in FIG. 2). The occupant classification system 12 further includes a capacitive sensing element 44 (e.g., polyester or another spacer material) and a piezoelectric element 46 (e.g., polyvinylidene fluoride (PVDF) or another piezoelectric element) for sensing objects. PVDF may be a desired material for the element 46 because it produces significant changes in surface voltage for a given applied strain/stress and it is very flexible and yet strong. The piezoelectric sensing element may be of a configuration as disclosed in U.S. Pat. No. 5,232,243, which is herein incorporated by reference in its entirety. In the embodiment of FIG. 3, the elements 44 and 46 may be coupled to a piezoelectric sensing conductive layer 50 (e.g., made of silver ink, carbon ink, copper, or other conductor) and to a capacitive sensing electrode and piezoelectric shield 48 (e.g., another conductive layer). The assembly shown in FIG. 3 may further include a conductor or insulator (e.g., dielectric ink) between the elements 44 and 46, an insulator around the outside of the assembly 49, and adhesive layers 51 within the assembly for holding the various layers of the assembly together.

In the embodiment of FIG. 3, circuit switching may be used to change the mode of measurement. For example, for capacitance measurement, switches S1 and S3 may be closed and the other switches open, and for vibration measurement using the piezoelectric sensor, switches S2, S4, and S5 may be closed and the other switches open.

The piezoelectric sensing element 46 is used to determine occupancy of the seat. As a person sits on the seat or when an object is placed in the seat (e.g., applying dynamic stress), the piezoelectric sensor generates a signal as it is bent or flexed as a result of the person or object. The signal relates to the frequency or vibration of the sensor. The signal is received by the electronics 42 to determine frequency information and other properties of the signal. The signal can then be used or processed by a controller or processing electronics to determine the presence of a person or object, and the weight of the person if applicable. Further, as an object or person shifts in the seat, the piezoelectric sensor can pick up the changes and the altered signal may be processed to determine further properties of the person or object on the seat. According to an exemplary embodiment, the piezoelectric sensing element 46 can measure frequencies greater than approximately 0.01 Hz.

The characteristics of the vibrations of the piezoelectric sensing element 46 may be used to determine a classification of an object or person. For example, when a person or object sits on the seat initially, the resulting frequency of the signal received by electronics 42 may indicate the change in status of the seat. As the object or person shifts around in the seat, the resulting change in frequency can indicate that the object or person is still present on the seat despite the shifting, while the capacitive sensing element 44 may have a different reading.

When the conductive layer 48 is used to sense the electric field, it may be driven by an appropriate detection circuit that typically employs a sinusoidal drive voltage with a high frequency (e.g., about 100 kHz). Lower frequency piezoelectric signals not matching the drive frequency may be removed from consideration by filtering and demodulation. When the conductive layer 50 is being used to sense piezoelectric effects, the capacitive drive circuits may be disconnected or inoperative (open S1 and S3) so that they have little to no effect on the collection of charge or changing voltages from the conductive layer by the piezoelectric sensing circuit.

Figure 4:
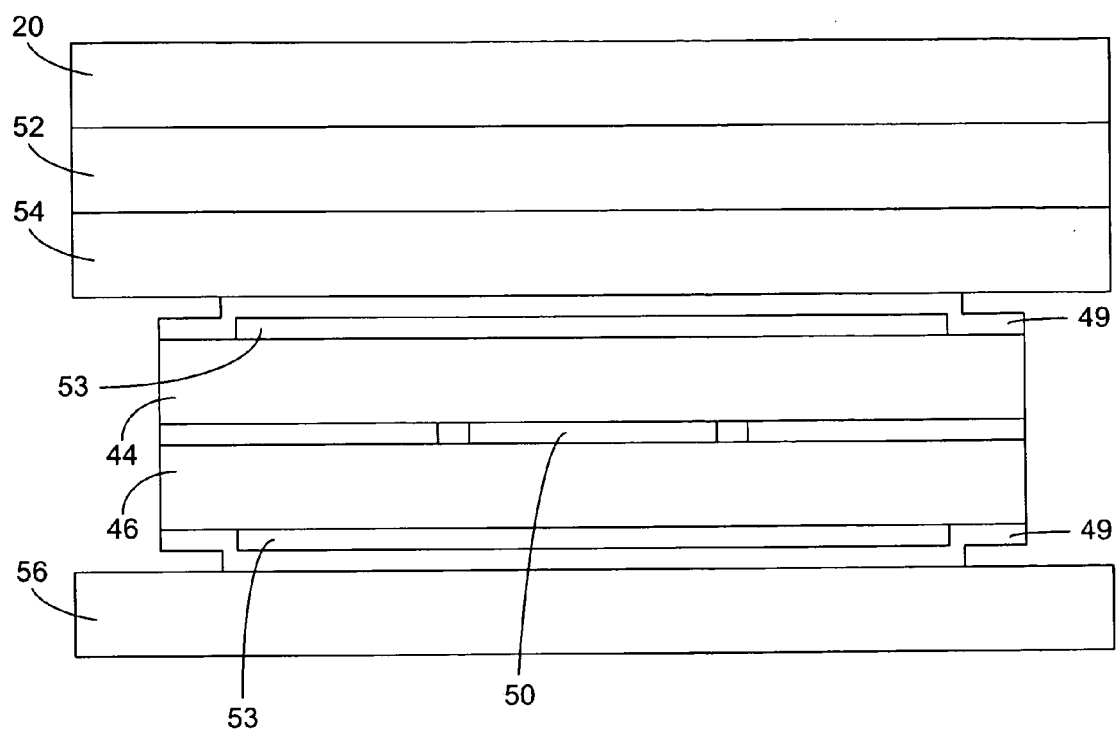
FIG. 4 is a cross-sectional view of a combination of a seat and the occupant classification system of FIG. 3, according to an exemplary embodiment.

FIG. 4 is a cross-sectional view of the occupant classification system 12 of FIG. 3 and a vehicle seat, according to an exemplary embodiment. In the embodiment of FIG. 4, the capacitive sensing electrode 44 may be integrated with a seat heating element 54. The heating/sensing element may include shield elements and may be of a configuration as disclosed in U.S. Provisional Patent Application No. 61/136,178 and U.S. Pat. No. 6,703,845, each of which is incorporated by reference herein in its entirety. The sensing element 46 are between the seat heating element 54 and the seat bottom foam 56. The seat cover 20 and other padding 52 may additionally be above the sensing element 46. The layer 44 can be any insulator to separate the shield conductor 53 from the piezo sensing conductive layer 50.

Figure 5:
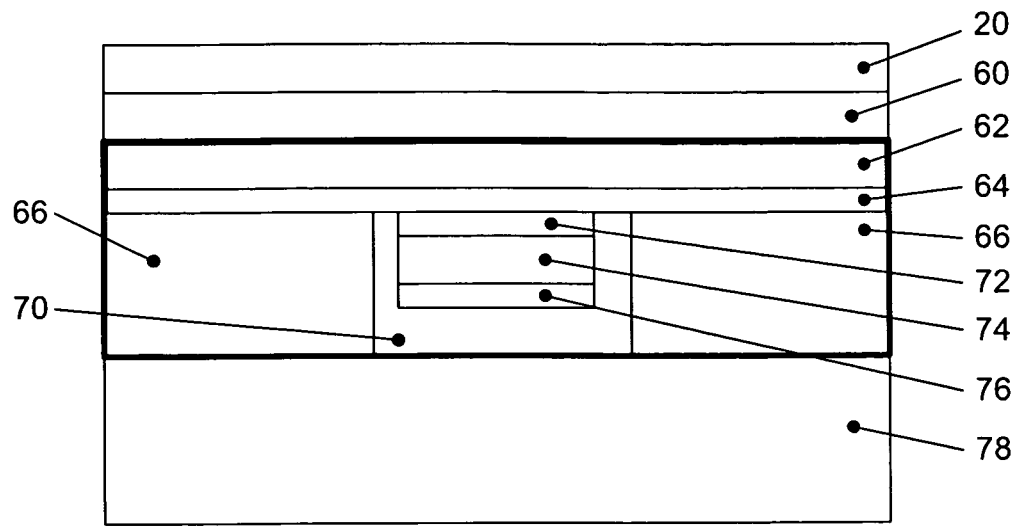
FIG. 5 is a cross-sectional view of a seat and the occupant classification system of FIG. 3, according to another exemplary embodiment.

A cross-sectional view of a combination of sensors (e.g., sensing elements 44, 46 shown in FIG. 4) in a seat bottom according to an exemplary embodiment is shown in FIG. 5. The seat generally includes a seating foam 78 at the base of the seat, occupant sensing components 62-76 on the seat foam 78, and a seat cover 20 on the occupant sensing components. Additional seating foam 60 may optionally be located between the occupant sensing components 62-76 and the seating cover 20.

The occupant sensing components may include a capacitive sensing element 62 (e.g., the sensing element 44 of FIG. 3), an electrical insulator 64, top and bottom piezoelectric conductive layers 72, 76, a piezoelectric element 74 (e.g., the sensing element 46 of FIG. 3), an electromagnetic shield 70, and a mechanical filler material 66. The capacitive sensing element 62 may include an electrode for electric field sensing of the presence of objects or persons on the seat. According to one exemplary embodiment, the capacitive sensing element 62 may be similar to the capacitive sensing element disclosed in U.S. Pat. No. 6,703,845, which is incorporated by reference herein in its entirety. According to other exemplary embodiments, other capacitive sensing elements may be used that are capable of detecting the presence of objects or persons on the seat. The capacitive sensing element 62 may include or act as an electromagnetic shield on one side of the piezoelectric element 74.

The electrical insulator or insulation 64 may be located between the capacitive sensing element 62 and the piezoelectric element 74. According to some exemplary embodiments, the electrical insulation 64 may be a plastic layer (e.g., a thin plastic layer), however according to other exemplary embodiments, any electrical insulator may be used.

The top and bottom piezoelectric conductive layers 72, 76 are generally conductive layers (e.g., silk-screen deposited silver ink) located or placed on two sides of the piezoelectric element 74 (e.g., the piezoelectric plastic) to collect charge or voltage changes present along the surface of the piezoelectric element 74 when it undergoes stress or vibration. According to various exemplary embodiments, the piezoelectric conductive layers 72, 76 may include any conductive material capable of collecting charge or voltage changes.

The piezoelectric element 74 may be any piezoelectric element according to various exemplary embodiments, for example, a thin film or a coaxial cable piezoelectric element. One of more piezoelectric elements may be placed in various locations to obtain the desired signals. An advantage to using a piezoelectric element is that the proper active driving and detection electronics may allow the sensor to detect and differentiate some seat loading conditions when the engine is off and/or idling without requiring the user to drive the car.

The electromagnetic shield 70 may at least partially protect at least the positive side of the sensing circuit from electromagnetic interference. According to one exemplary embodiment, this shielding may be a metal foil adhered to an insulator (e.g., a thin plastic sheet), while in other exemplary embodiments, any passive or active electromagnetic shield may be used.

The mechanical filler 66 is used so that the sensor package meet subjective touch tests so that the sensor is not felt. The mechanical filler 66 may be a foam, felt, fabric, or other material capable of blending the mechanical profile of the sensor into the surrounding seat foam so that it can not be felt or cannot be easily felt. According to other exemplary embodiments, the mechanical filler 66 may be omitted, for example when seat foam is added between the seat cover 20 and the occupant sensing components.

Figure 6:
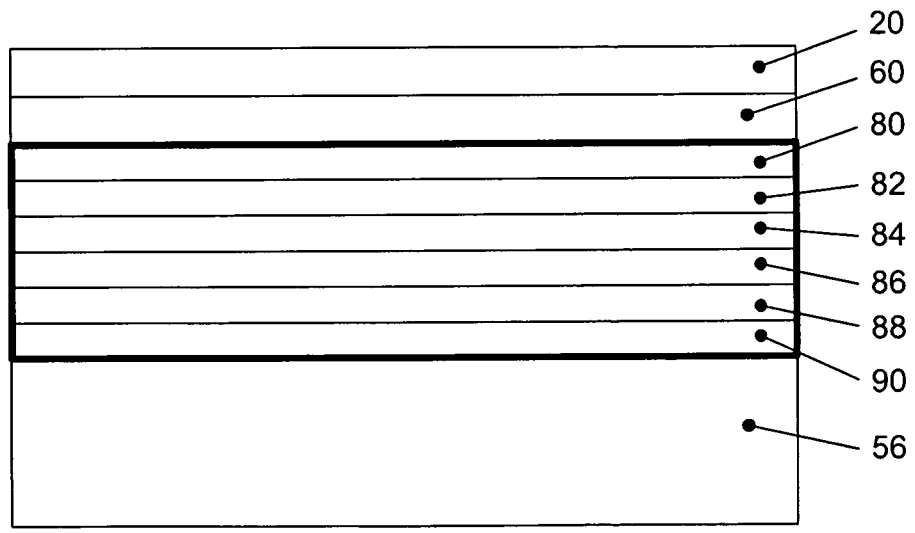
FIG. 6 is a cross-sectional view of a seat and occupant classification system, according to yet another exemplary embodiment.
Figure 7:
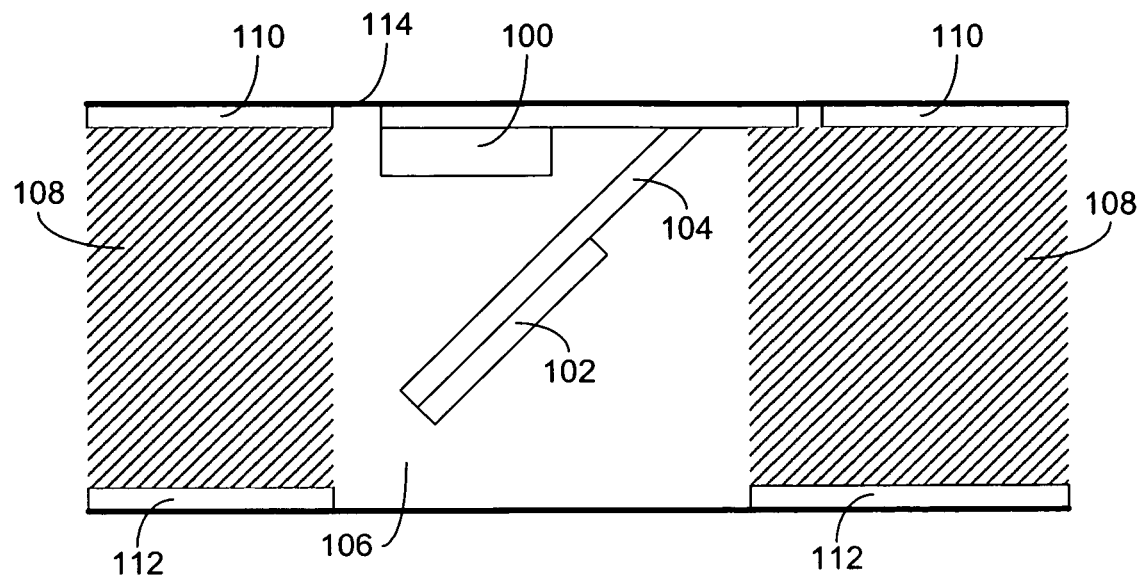
FIG. 7 is a cross-section of an occupant classification system including a capacitive sensing element and a capacitive mechanical vibration sensing element, according to an exemplary embodiment.

Referring to FIG. 6, a cross-sectional view of a combination of sensors (e.g., sensing elements 44, 46) is illustrated in a seat bottom according to another exemplary embodiment. The embodiment of FIG. 6 includes occupant sensing components 80-90 installed between the seat cover 20 and seat foam 56, 60. This arrangement may be preferred because the capacitive electrode and the conductive surface used to collect charge or sense a voltage change on the top surface of the piezoelectric element 84 is a common element. This arrangement may also be preferred because the ground plane sometimes used in capacitive sensing can also act as the electromagnetic shield for the piezoelectric surface connected to the positive side of the sense circuit in a time multiplexed arrangement. In this combined design, two conductive elements serve dual functions, capacitive or piezoelectric, depending upon the measurement mode. A conductive and flexible material (e.g., silver ink) can be silk-screened directly onto the piezoelectric plastic film element. This conductive layer can serve as both the actual capacitive electrode during one time period and then by switching/multiplexing the connection to this conductive layer it can serve to conduct the voltage or charge produced by the piezoelectric element when it is subjected to stress and vibration.

The electrode used for electric field sensing of the presence of objects or persons in the seat may be any electric field sensing electrode, for example the electrodes disclosed in U.S. Pat. Nos. 6,703,845 and 6,577,023, each of which are incorporated by reference herein in their entirety. The element is electrically connected to the top side of the piezoelectric element 84 and acts to transmit the electric charge or voltage generated on that side to a multiplexed sense circuit. The element may be a compliant, conductive element (e.g., silver ink) that is applied directly to the piezoelectric element 84. The capacitive electrode can extend beyond the piezoelectric element 84 to cover a wider area or pattern, if desired, by also applying the conductive element (e.g. silver ink) to adjacent or nearby structural plastic that is not piezoelectric. The element 84 may be the positive polarity sensing side of the piezoelectric sensing circuit.

The electrical insulation 80 may be located between the capacitive element 82 and the electromagnetic shield, for example a thin plastic/dielectric layer. Any electrical insulator on top of the piezoelectric electrically conductive top surface (e.g., on the capacitive element 82) may be used to mechanically protect the surface from damage or electrical shorting. The electrical insulation 80 may not be required for some packaging arrangements.

The piezoelectric sensing element 84 may be any thin film, flexible piezoelectric material according to various exemplary embodiments, for example, PVDF. One or more piezoelectric sensing elements may be placed in various locations to obtain the desired mechanical vibration signals.

The piezoelectric electrically conductive bottom surface 86 may be electrically connected to the bottom side of the piezoelectric element 84. The bottom surface 86 may transmit the electric charge or voltage generated on the bottom side to a multiplexed sense circuit. The bottom surface 86 may be coupled to the negative or ground side of the piezoelectric sense circuit. The bottom surface 86 may also include a ground plane or active ground used for electric field sensing of the presence of objects or persons in a seat (if ground plane is needed in the application). The bottom surface 86 may be any compliant, conductive element (e.g., silver ink) that is applied directly to the piezoelectric element 84

The piezoelectric element 84 and piezoelectric conductive surface 86 (designated as the positive side of the sense circuit) may require electromagnetic shielding to cover it. This shielding may be a metal foil or silk-screened metal ink adhered to the adjacent layer electrical insulator 80, 88 or any other passive or active electromagnetic shield. The shield 90 may be the active ground plane for the capacitive electric field sensor if it is spaced sufficiently from the capacitive sensing element 82.

Another method that may be used to sense mechanical vibrations (e.g., vibrations created by movement or weight in a vehicle seat) employs a capacitive element or elements that can be distributed over the sensing area. The elements may have a small capacitive member configured to vibrate relative to a ground plane such that the vibration constraint, and thereby frequency response, changes as a function of the applied force (e.g., the person or object) on the sensing region (e.g., the seat). This mechanical vibration sensing technique may use low cost materials and may share common electronics (e.g., power supply, clock, sampling circuits, memory, microprocessor, etc.) with the capacitive electric sensing technique. This technique additionally can provide a response for frequencies down to 0 Hz.

With reference to FIG. 7, a capacitive frequency sensor surface 100 is an actively driven capacitance sensor sampled at a minimum rate of, for example, 60 Hz. The capacitive frequency sensor surface 100 includes conductive material and is electrically coupled in parallel with the other sensor surface 100 locations. A capacitive frequency sensor surface 102 may be a sensor surface grounded to the vehicle chassis and made of electrically conductive material. A vibrating structure 104 is configured to support the sensor capacitive surfaces 100 and 102 (active and ground). The structure 104 is configured to vibrate in an open space 106 and to have its vibration frequency response altered by damping when a compression force is applied to the device from a weight on the seat.

A separator 108 is configured to maintain at least some physical separation between top and bottom laminate surfaces 114 so that the vibrating structure has space to vibrate when a smaller mass is placed on the seat. The separator 108 may include any compressible (e.g., foam) or flexible (e.g., plastic) non-conductive material. The separator 108 is also configured to separate a sensor 110 configured to sense a capacitive electric field magnitude and a capacitive electric field magnitude active ground 112. The laminate structures 114 may be any protective structure (e.g., plastic) that can be used to encase the electrodes. A vibration cell wall (e.g., any non-conductive wall) may be used to provide an air filled volume in which the vibrating structure can vibrate.

Figure 9:
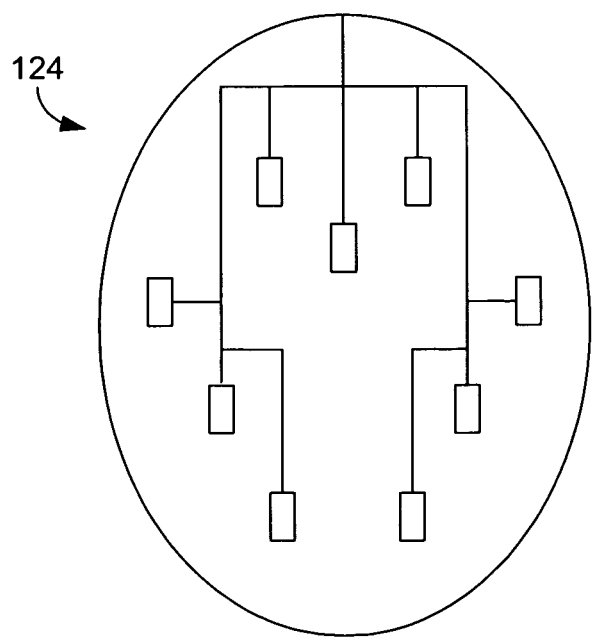
FIG. 9 is a diagram of a distributed element mechanical vibration sensor arrangement relative to an electric field capacitance sensor, according to an exemplary embodiment.
Figure 8:
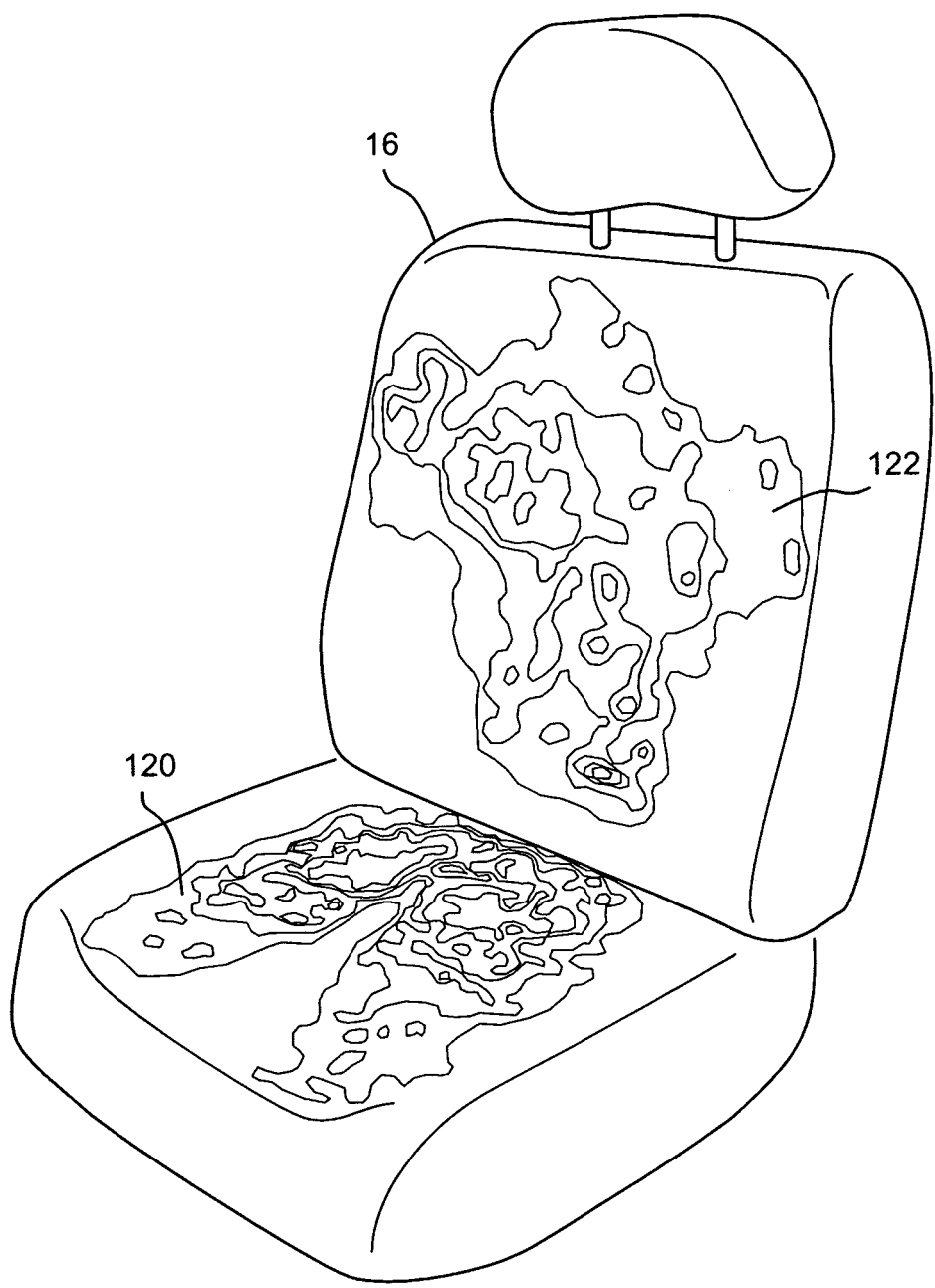
FIG. 8 is an illustration of pressure distribution on a seat from a person, according to an exemplary embodiment.

For any vibration sensing concept or technique, the sensor may provide more information if the sensor is distributed across the surface of the seat. FIGS. 8-9 illustrate both an exemplary pressure distribution of a person seated while driving and an exemplary distribution pattern 124 for a plurality of small capacitive vibration sensors or small strips of piezoelectric material sensing elements. The pressure distributions 120, 122 for the seat bottom and seat back of the seat 16 are shown in FIG. 8, and a sensor distribution pattern 124 is shown in FIG. 9 for optimally measuring the pressure shown in FIG. 8. The sensor distribution patterns may be adjusted to minimize or lower cost and to maximize or increase the differentiation ability of the two sensor elements relative to the most desired targets, for example: empty seat, child seat, 5th-percentile female, and 50th-percentile male. Other additional occupant discrimination classes may be used, depending on the application, for example, a 3-year old child, a 6-year old child, a 95-percentile male, etc. Distribution of the sensing elements is not limited to the seat A-surface or to the seat bottom, but may also be placed in the seat middle or the seat back to determine the applied force on the seat back, or in the floor pan to measure applied force of feet on the floor. In such cases, occupant weight on these elements and/or occupant stature may be detected based on if the occupant engages or does not engage a sensor. The placement and distribution of the sensors may be configured to improve occupant detection and classification of a greater number of statures, shapes, weights, and sizes through a range of due care cases.

Referring now to FIG. 10, an occupant classification system including a force sensitive resistor (FSR) sensing system is shown, according to an exemplary embodiment. The FSR sensing system may be used to detect small frequencies (e.g., from 0 Hz to 60 Hz, from 0 Hz to 20 Hz, etc.) that may not be detected by other sensing systems. Using a FSR, an occupant classification system can detect an indication of seat loading in a static condition before mechanical vibration may exist. The occupant classification system uses a change in resistance or impedance of a force sensitive resistor to determine the presence of and classify people and objects. Using a FSR, the average frequency of the vibrational component of the signal provided to a controller of the occupant classification system decreases as the mass in the seat increases.

In the embodiment of FIG. 10, a top view of a seat and occupant classification system is shown. A capacitive mat 130 is shown that may be installed below a seat cover. Multiple force sensitive resistors 132 are shown in the capacitive mat 130 connected to the circuitry 134 of the mat 130. The small patches of FSR sensor material placed throughout the mat 130 as an additional layer of the object classification system assembly. In the embodiment of FIG. 10, the FSRs 130 are shown wired in series in order to obtain a single average signal. In other exemplary embodiments, each individual FSR 130 may be measured independently. Also referring to FIG. 2B, FSR vibration sensor signals sent through the high pass filter 39 may be used to characterize the vibration.

Although the occupant sensing system is illustrated as including multiple features utilized in conjunction with one another, the occupant sensing system may alternatively utilize more or less than all of the noted mechanisms or features. For example, in other exemplary embodiments, there may be more or fewer than the illustrated sensors.

Although specific shapes of each element have been set forth in the drawings, each element may be of any other shape that facilitates the function to be performed by that element. For example, the sensing elements, shield elements, and ground planes have been shown as generally rectangular or as flat plates, however, in other exemplary embodiments the structure may define that of one or more wires, coils, or electronic components of any shape.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A system for classifying an occupant located on a seating surface of a vehicle seat comprising:
a movable element located in the vehicle seat, wherein the movable element is configured to move when there is downward force on the element;
an electric field sensor located in the vehicle seat, wherein the electric field sensor includes a first conductor positioned below the seating surface of the seat;

a sensing circuit configured to supply a first signal to the first conductor;

wherein the sensing circuit includes measurement electronics configured to measure the current being supplied to the first conductor, wherein the measurement is affected by the presence of an object on the seating surface, and wherein the measurement electronics are configured to measure the vibration of the moveable element; and a controller configured to discriminate between different types of objects located on the seating surface based on changes in the current being supplied to the first conductor and the vibration of the moveable element; and wherein the controller is configured to communicate the occupant classification based on the discrimination.

2. The system of claim 1, wherein the controller considers a measure of the frequency of the vibration of the movable element in order to discriminate between different objects on the seat.

3. The system of claim 1, wherein the measurement electronics are configured to alternatively measure a change in the first signal being supplied to the conductor due to the presence of the object on the seating surface and to measure the vibration of the moveable element's movement.

4. The system of claim 1, wherein the movable element comprises a force sensitive resistive component.

5. The system of claim 1, wherein the movable element comprises a second conductor and wherein the magnitude of the capacitance between the first and second conductors changes with downward force on the seat.

6. The system of claim 4, wherein the controller considers a measure of the frequency of the change in displacement of the movable element in order to discriminate between different objects on the seat.

7. The system of claim 1, wherein the movable element comprises the first conductor.

8. A system for classifying an occupant located on a seating surface of a vehicle seat comprising:

a movable element and a conductor located in the vehicle seat, electronic circuitry configured to supply a signal to the conductor and wherein the circuitry is configured to measure the signal to the conductor and the vibration of the moveable element; and a controller configured to discriminate between different types of objects located on the seating surface based on changes in the signal being supplied to the conductor caused by changes in the electric field surrounding the conductor due to the presence of an object on the seating surface and the vibration of the moveable element.

9. The system of claim 8, wherein the controller considers a measure of the frequency of the vibration of the movable element in order to discriminate between different objects on the seat.

10. The system of claim 8, wherein the movable element comprising a second electrode and wherein the magnitude of the capacitance between the first and second conductors changes with downward force on the seat.

11. The system of claim 10, wherein the controller considers a measure of the frequency of the change in displacement of the movable element in order to discriminate between different objects on the seat.

12. The system of claim 8, wherein the movable element comprises the electrode.

13. The system of claim 8, wherein the movable element comprises a piezo material that is configured to generate a signal in response to a downward force on the seat.

14. The system of claim 13, wherein the signal generated by the piezo material includes frequency information that correlates to the vibration of the movable element and wherein the controller is configured to discriminate between different types of objects located on the seating surface based on changes in the frequency information.

* * * * *